United States Patent
Zhang

(10) Patent No.: US 8,823,352 B2
(45) Date of Patent: Sep. 2, 2014

(54) SWITCHING POWER SUPPLY HAVING SEPARATE AC AND DC CURRENT SENSING PATHS

(75) Inventor: Jindong Zhang, Fremont, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

(21) Appl. No.: 13/180,460

(22) Filed: Jul. 11, 2011

(65) Prior Publication Data

US 2013/0015830 A1 Jan. 17, 2013

(51) Int. Cl.
*G05F 1/00* (2006.01)
*H02M 1/14* (2006.01)
*H02M 3/158* (2006.01)
*H02M 1/00* (2006.01)

(52) U.S. Cl.
CPC .... *H02M 3/1588* (2013.01); *H02M 2001/0009* (2013.01); *H02M 1/14* (2013.01); *Y02B 70/1466* (2013.01)
USPC ............ 323/286; 323/282; 323/271; 323/285

(58) Field of Classification Search
USPC .................................. 323/282–286, 271, 275
See application file for complete search history.

(56) References Cited

U.S. PATENT DOCUMENTS

| | | | | |
|---|---|---|---|---|
| 4,885,674 A * | 12/1989 | Varga et al. | ................. | 363/21.09 |
| 5,982,160 A | 11/1999 | Walters et al. | | |
| 6,781,354 B2 * | 8/2004 | Zhang | ........................... | 323/224 |
| 6,879,137 B2 * | 4/2005 | Sase et al. | ...................... | 323/282 |
| 7,417,413 B2 * | 8/2008 | Noma et al. | .................. | 323/285 |
| 7,710,084 B1 * | 5/2010 | Guo | ................... | 323/224 |
| 7,915,871 B2 * | 3/2011 | Wang et al. | ..................... | 323/222 |
| 8,159,205 B1 * | 4/2012 | Latham et al. | ................ | 323/286 |
| 2006/0091872 A1 * | 5/2006 | Matsuura | ...................... | 323/283 |
| 2009/0302820 A1 * | 12/2009 | Shimizu et al. | ............... | 323/285 |
| 2011/0221418 A1 * | 9/2011 | Chen | ............................. | 323/299 |
| 2011/0316508 A1 * | 12/2011 | Cheng et al. | .................. | 323/282 |
| 2012/0049827 A1 * | 3/2012 | Hirose | .......................... | 323/284 |

OTHER PUBLICATIONS

Chin Chang, "Lossless Current Sensing and Its Application in Current Mode Control", Power Electronics Specialists Conference, Jun. 15, 2008, IEEE, Piscataway, New Jersey, US.

(Continued)

*Primary Examiner* — Adolf Berhane
*Assistant Examiner* — Henry Lee, III
(74) *Attorney, Agent, or Firm* — Patent Law Group LLP; Brian D Ogonowsky

(57) ABSTRACT

In a current mode controlled switching power supply, current through the inductor is sensed to determine when to turn off or on the switching transistors. The inductor current has a higher frequency AC component and a lower frequency DC component. The AC current feedback path, sensing the ramping ripple current, is separate from the DC current path, sensing the lower frequency average current. Separating the current sensing paths allows the signal to noise ratio of the AC sense signal to be increased and allows the switching noise to be filtered from the DC sense signal. The gain of the DC sense signal is adjusted so that the DC sense signal has the proper proportion to the AC sense signal. The AC sense signal and the DC sense signal are combined by a summing circuit. The composite sense signal is applied to a PWM comparator to control the duty cycle of the switch.

20 Claims, 5 Drawing Sheets

(56) References Cited

OTHER PUBLICATIONS

Kuang-Yao Cheng et al., "Digital Enhanced V2-Type Constant On-Time Control Using Inductor Current Ramp Estimator for a Buck Converter with Small ESR Capacitors", Energy Conversion Congress and Exposition, Sep. 12, 2010, IEEE, Piscataway, New Jersey, US.

Wenkang Huang et al., "Inductors Allow Loss-Less Current Sensing in Multiphase DC-DC Converters", PCIM Power Electronic Systems, Jun. 1, 2001, pp. 58-67, vol. 27, No. 6, Intertec International Ventura, CA, US.

* cited by examiner

SWITCHING POWER SUPPLY HAVING SEPARATE AC AND DC CURRENT SENSING PATHS

FIELD OF THE INVENTION

This invention relates to DC/DC converters and, in particular, to sensing the current in a current mode controlled switching power supply.

BACKGROUND

FIG. 1 illustrates one type of prior art current mode DC/DC switching power supply, also known as a current mode DC/DC converter. Many other converter configurations can also benefit from the present invention. The type of converter shown in FIG. 1 is a peak current mode converter.

The operation of the converter is conventional and is as follows.

A clock (Clk) signal is applied to the set input of an RS flip flop 20.

The setting of the RS flip flop 20 generates a high signal at its Q output. A logic circuit 24, in response, turns transistor switch 26 on and turns the synchronous rectifier switch 28 off. Both switches may be MOSFETs or other transistors. A diode may replace the synchronous rectifier switch 28. The logic circuit 24 ensures that there is no cross-conduction of switches 26 and 28. The input voltage Vin applied to an inductor L1 through the switch 26 causes a ramping current to flow through the inductor L1, and this current flows through a low value sense resistor 32. The ramping current is filtered by an output capacitor 36 and supplies current to the load 38. The output capacitor 36 is relatively large to smooth out ripple.

The output voltage Vo is applied to a voltage divider 42, and the divided voltage is applied to the negative input of a transconductance error amplifier 44. Note this amplifier 44 can be either a current-output type transconductance amplifier or a voltage-output type amplifier. Capacitors may be connected across the resistors in the divider 42 to further compensate the feedback voltage. A reference voltage Vref is applied to the positive input of the amplifier 44. The output current of the amplifier 44 corresponds to the difference between the actual output voltage Vo and the desired output voltage. The voltage (a control voltage Vc) across a capacitor 46 at the output of the amplifier 44 is adjusted up or down based on the positive or negative current output of the amplifier 44. The control voltage Vc at the capacitor 46, among other things, sets the duty cycle of the switch 26, and the level of the control voltage Vc is that needed to equalize the inputs into the amplifier 44. A resistor and capacitor may be connected in parallel with the capacitor 46 for controlling and optimizing the phase and loop stability, as is well known.

The control voltage Vc is applied to a pulse width modulation (PWM) comparator 50. The ramping voltage across the sense resistor 32, when the switch 26 is on, is sensed by a differential amplifier 52, having a certain gain, and, when the output of the amplifier 52 exceeds the control voltage Vc, the PWM comparator 50 is triggered to output a reset signal to the RS flip flop 20. This turns the switch 26 off and turns the synchronous rectifier switch 28 on to discharge the inductor L1, causing a downward ramping current. In this way, the peak current through the inductor L1 for each cycle is regulated to generate a desired output voltage Vo. The current through the sense resistor 32 includes a DC component (the lower frequency, average current) and an AC component (the higher frequency, ripple current).

FIG. 1 also illustrates a conventional slope compensation circuit 59, as is well known for current mode power converters. At high duty cycles (typically greater than 50%), the slope compensation circuit 59 turns off the switch 26 before the inductor current ramp crosses the control voltage Vc to reduce sub-harmonic oscillations that may occur in the current loop at the high duty cycles. The effect of the slope compensation circuit 59 is unrelated to the present invention.

As will be described with respect to FIG. 3, switching noise (e.g., high frequency spikes and oscillations) by the turning on or off of the switch 26 is coupled to the current sense circuit and causes false triggering of the PWM comparator 50, resulting in jitter and an increase of ripple on the output voltage Vo.

The voltage drop and the power dissipation across the low value sense resistor 32 becomes more and more significant with higher currents and lower output voltages. It is desirable to use a small value sense resistor to reduce its power dissipation. Unfortunately, providing a very low value sense resistor 32 results in a low signal to noise ratio of the sensing signal, causing imprecise switching, in addition to the switching noise problem. Furthermore, it is desirable to even eliminate the sense resistor altogether to save power loss and improve the converter efficiency.

Instead of detecting the inductor current through a sense resistor, the current through the inductor L1 may be sensed by detecting the voltage drop across the switch 26 (e.g., a MOSFET). The on-resistance of such a MOSFETs may be a few mohms. However, such sensing still results in a low signal to noise ratio of the sensing signal and imprecise switching, in addition to the switching noise problem.

FIG. 2 illustrates using the inherent DC winding resistance (DCR) of the inductor L1 to detect the inductor current. An inductor winding may have a DC resistance on the order of a few mohms to less than 1 mohm. An RC network, comprising the series connection of a resistor R and capacitor C, connected across the inductor L1 is selected to have substantially the same time constant as that of the inductor and DCR so that RC=L1/DCR. Accordingly, the ramping voltage across the capacitor C will track the ramping current through the inductor L1. The voltage across the capacitor C is then sensed by the differential amplifier 52, and the remainder of the operation is the same as that described with respect to FIG. 1. The sensed voltage across the capacitor C includes a DC component (corresponding to the lower frequency, average current) and an AC component (corresponding to higher frequency, ripple current). In an application with very low inductor DCR value, the converter of FIG. 2 suffers from the same switching noise problem and signal to noise ratio problem as described with respect to FIG. 1. Since the RC time constant must match the L1/DCR time constant for proper operation, the signal to noise ratio cannot be improved using the technique of FIG. 2.

FIG. 3 illustrates the problem with switching noise. The clock pulse 62 (Clk in FIGS. 1 and 2) turns on the switch 26 and turns off the switch 28. The switching causes a high frequency oscillation due to the various parasitic capacitances and inductances in the system. When the sensed inductor current signal rises to cross the control voltage Vc, triggering the PWM comparator 50, the switch 26 is turned off, creating switching noise. The resulting spike and oscillation can cause false triggering of the comparator 50, resulting in a jittering of the comparator 50 output. This jitter is shown by the variability 63 in the on-time 64 of the switch 26. This adversely affects the duty cycle control precision and the regulation of the output voltage Vo. The problem can become much worse in a multi-phase paralleled converter in which switching noises can be coupled among phases.

What is needed is a current sensing technique for a switching power supply that reduces the jitter stemming from switching noise and also improves the signal to noise ratio of the current sense feedback loop with very low resistance value current sensing elements.

SUMMARY

In a current mode controlled switching power supply, current through the inductor is sensed, by a current feedback loop, to determine when to turn off the switching transistor. A low resistance value current sensing element is preferred to minimize the power dissipation in the sensing element. The current feedback loop in the preferred embodiment of the invention both increases the signal to noise ratio of the ramping current sense signal and reduces the effect of the switching noise on the duty cycle control. The DC (lower frequency, average current) component of the sensed current and the AC (higher frequency, ripple current) component of the sensed current are measured using separate paths. The AC path has a higher signal to noise ratio than the DC path (for more precise detection of the ramping current level), and the DC path includes a low pass filter to filter out switching noise. The gain of the DC sense signal is adjusted upward so that the DC sense signal has the proper proportion to the AC sense signal to accurately reproduce the entire inductor current signal at the input of the PWM comparator.

In one embodiment, for the AC sensing path, a first RC circuit connected across the inductor (L1) has a time constant that is lower than L1/DCR so that the capacitor charges to a higher AC voltage compared to the prior art example of FIG. 2, where the time constant of the RC circuit was required to match L1/DCR. This enables more accurate detection of when the sensed current ramp crosses the control voltage Vc. For the DC path, a second RC circuit is connected across the inductor and has a time constant that is equal to or greater than L1/DCR (signal to noise ratio not improved). The DC sense signal is applied to a low pass filter to further eliminate the switching noise. The gain of the DC sense signal is controlled by a low voltage offset amplifier so that the DC sense signal is in the proper proportion to the AC sense signal so there is no distortion. The AC sense signal and DC sense signal are then summed. The summed signal is applied to the PWM comparator for comparison with the control voltage Vc. The summed signal has a high signal to noise ratio (due to the AC path) and reduced switching noise (due to the DC path). Thus the duty cycle is more precisely controlled. The amplifier may itself act as the low pass filter by using a capacitor in a negative feedback loop, or the filter may be a separate component.

In another embodiment, the DC sense signal is sampled and held, further reducing the effect of switching noise.

In another embodiment, the AC sense signal is detected and generated by measuring the voltage across the inductor, and the DC sense signal is detected as described in the other examples. The DC sense signal is gain-adjusted and summed with the AC sense signal.

In another embodiment, the AC sense signal is detected by the first RC circuit as described in the other examples, and the DC sense signal is taken across the capacitor in the first RC circuit and then filtered to remove the switching noise. The DC sense signal is gain-adjusted and summed with the AC sensed signal.

The DC or AC sense signal may also be detected across a separate sense resistor or across the power switch.

The DC and/or AC sense signal may be processed digitally using analog-to-digital converters and a digital summing circuit or method.

In the various examples, the switching noise is virtually eliminated in the DC path, due to the low pass filter or sample and hold circuit, prior to summing the AC and DC sense signals so as to reduce the effect of switching noise in the summed current sense signal. To further improve the performance, the signal to noise ratio of the AC path is also increased.

Various other embodiments are described.

BRIEF DESCRIPTION OF THE DRAWINGS

Elements that are the same or equivalent are labeled with the same numeral.

DETAILED DESCRIPTION

Figure 1:
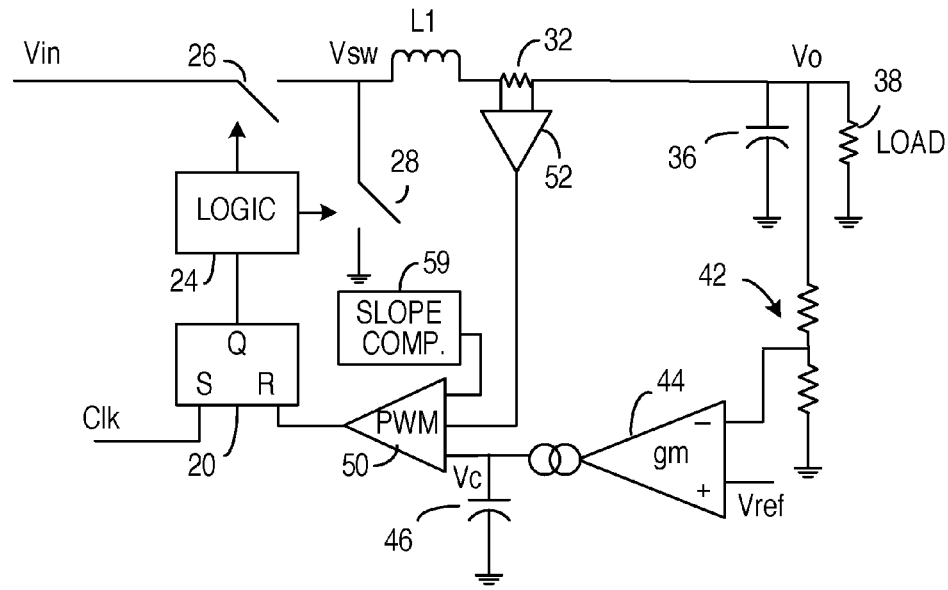
FIG. 1 illustrates a prior art DC/DC converter using a sense resistor to detect inductor current.

In the various embodiments of the invention shown in FIGS. 4-10, only the aspects of the converter that are different from the converter of FIG. 1 are shown for simplicity. Accordingly, the output of the PWM comparator 50 in FIGS. 4-10 is coupled to the switching circuitry as shown in FIG. 1, the output terminal of the inductor L1 is connected to the output circuit of FIG. 1, and the voltage feedback path for generating the control voltage Vc is that shown in FIG. 1. Other suitable circuitry may be used in conjunction with the present invention instead of the circuitry shown in FIG. 1.

Figure 4:
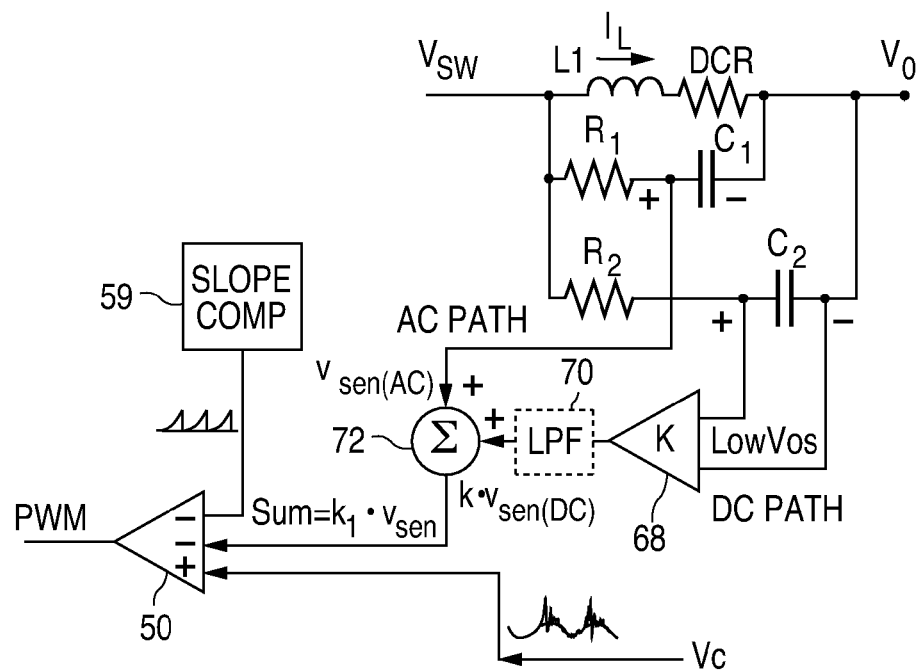
FIG. 4 illustrates a first embodiment of the invention using different RC circuits for the AC sense path and the DC sense path.

FIG. 4 illustrates a first embodiment of the invention using different RC circuits for the AC sense path and the DC sense path. A resistor R1 and capacitor C1 are connected in series across the inductor L1. The resistance DCR represents the inductor winding DC resistance. In contrast to the prior art FIG. 2, where the RC time constant should match the L1/DCR time constant to obtain accurate current sensing, the R1*C1 time constant is significantly less than L1/DCR to generate an enlarged AC ripple signal and therefore increase the signal to noise ratio of the AC voltage across capacitor C1. All the AC voltages are sensed across the capacitor C1 terminals, although only one AC lead is shown in the examples for simplicity. The R1*C1 time constant may be any time constant below L1/DCR for proper operation, since the gain of the DC path is adjusted to avoid distortion.

Figure 2:
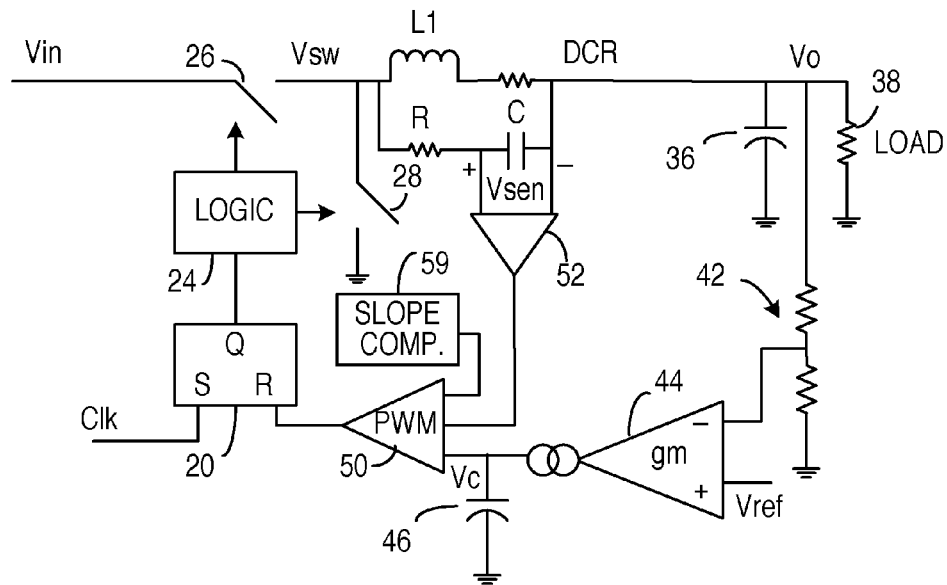
FIG. 2 illustrates another prior art DC/DC converter using the DCR of the inductor winding to detect inductor current.
Figure 3:
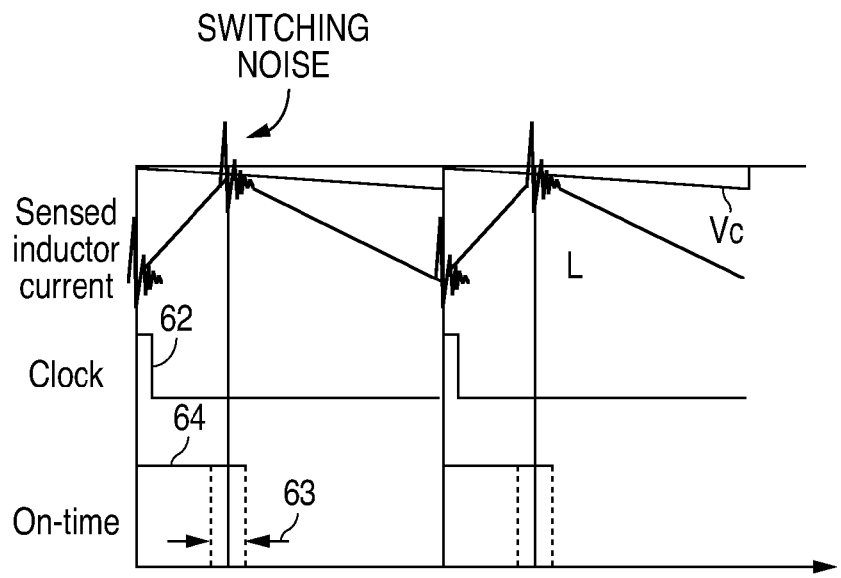
FIG. 3 illustrates the effect of switching noise on switch on-time jitter.

Either the R1 value or the C1 value or both may be reduced from that of FIG. 2 to lower the time constant. By lowering the time constant of R1*C1, the AC ripple voltage magnitude across capacitor C1 can be greatly increased compared to that in FIG. 2, as the current through the inductor L1 ramps up. This increased voltage signal increases the signal to noise ratio of the AC sense signal, making triggering of the PWM comparator 50 more accurately timed.

Since any switching noise contains frequencies much greater than the switching frequency, much of the switching noise will be filtered out by the capacitor C1, so the reduction of the time constant of R1*C1 does not adversely impact the effect of switching noise in the AC path.

A second current sensing path is formed by the series connection of resistor R2 and capacitor C2 across the inductor L1. The time constant of R2*C2 is equal to or greater than L1/DCR, but preferably greater than so as to further reduce the effects of ripple and noise in the DC path. The voltage across the capacitor C2 is applied to the differential inputs of a low offset voltage (Vos) differential amplifier 68 having a gain of K. The output of the amplifier 68 is applied to a low pass filter 70. The filter 70 filters out virtually all of the high frequency switching noise. The DC sense voltage is K*Vsen (dc).

The low pass filter 70 may be a capacitor connected to ground or may be a capacitor in a negative feedback path in the differential amplifier 68. Therefore, the low pass filter 70 is drawn in dashed outline.

In all the drawings showing a separate low pass filter and amplifier in the DC path, the filter and amplifier relative positions may be reversed. A differential filter would then be used.

The AC sense signal (Vsen(ac)) and the DC sense signal (K*Vsen(dc)) are summed by a conventional summer 72 to generate a composite current sense signal (k1*Vsense), where k1 is the total signal gain of the combined current sense signal, and Vsense is the actual voltage across the DCR. The value of (k1*Vsense) will be proportional to $i_L$*DCR, where $i_L$ is the current through the inductor L1. The gain of the amplifier 68 (greater than 1) is set such that the DC sense signal has the proper proportion to the AC sense signal to accurately convey the current through the inductor L1. A decreased time constant R1*C1 requires an increased gain of the amplifier 68 due to the increased AC ripple voltage across C1. The proper gain may be determined by simulation or frequency domain analysis.

Accordingly, the composite current sense signal has a higher signal to noise ratio compared to that of FIG. 2 and has less switching noise and jitter.

The composite current sense signal may also be used for current limiting, current sharing, and other uses. This technique may also be used in a phased converter, where each phase generates a portion of the output current.

In the various embodiments, although the term "DC" is used to identify one of the paths, the DC signal may vary at a relatively low frequency, representing an average current, as the load current varies. The terms DC and AC are intended to distinguish between the two paths and not intended to limit them.

Figure 5:
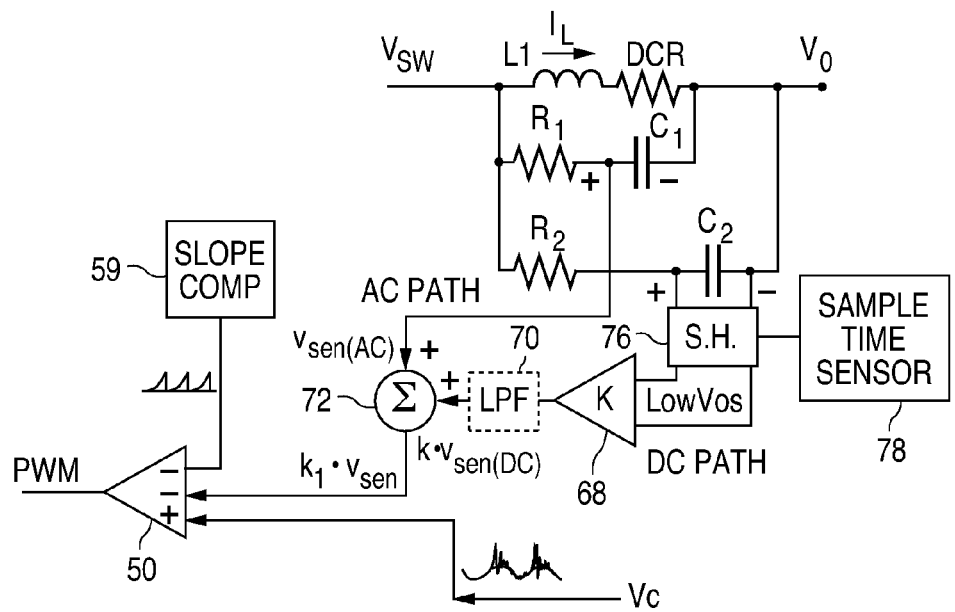
FIG. 5 illustrates a second embodiment of the invention using a sample and hold circuit in the DC sense path.

FIG. 5 illustrates a second embodiment of the invention, similar to FIG. 4 but using a sample and hold circuit 76 in the DC sense path. The sample and hold circuit 76 further reduces noise and ripple by sampling the voltage across the capacitor C2 at a time when the voltage is a midpoint of the voltage ramp, representing an average current. The sampling clock pulse is triggered when the sample sensor 78 detects when the voltage across the capacitor C2 is midway between its two peaks. This sensing may be implemented using known techniques. The sampled signal is held until the start of the next switching cycle. Accordingly, switching noise is eliminated from the DC path. In one embodiment, the low pass filter 70 is not used when the DC signal is sampled.

Figure 6:
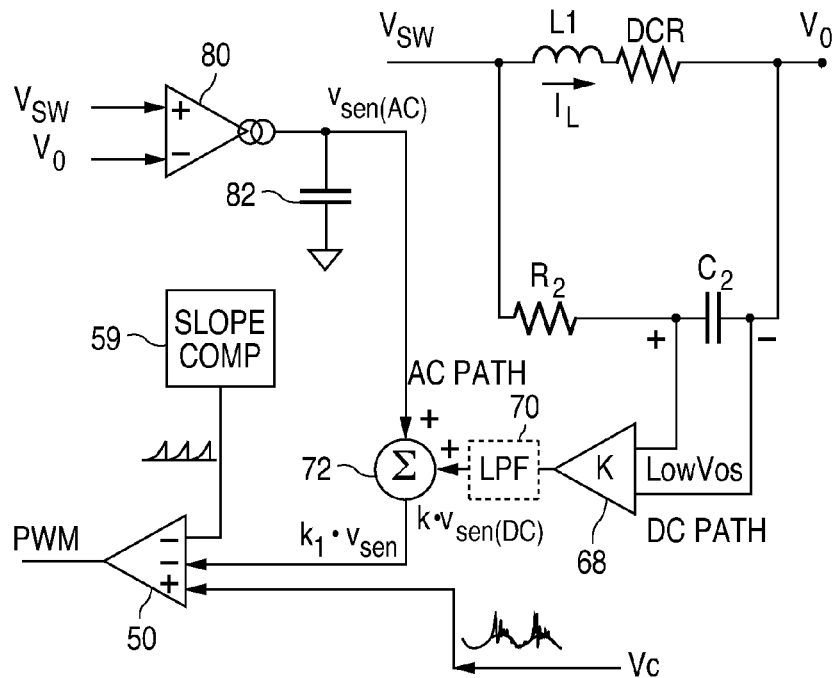
FIG. 6 illustrates a third embodiment of the invention where the AC current signal is sensed and generated by detecting the voltage across the inductor.

FIG. 6 illustrates a third embodiment of the invention where the AC current is sensed by directly detecting the voltage (Vsw−Vo) across the inductor. The di/dt through the inductor L1 is (Vsw−Vo)/L1. When the switch 26 (FIG. 1) is on, Vsw will be approximately the input voltage Vin. The Vsw and Vo voltages are applied to the inputs of a transconductance amplifier 80. The current output by the amplifier 80 charges a capacitor 82 to generate a varying sense voltage Vsen(ac). The capacitor 82 value can be reduced to enlarge the AC ripple signal to increase the signal to noise ratio. The R2C2 circuit may be identical to that shown in FIG. 4, except the gain of the amplifier 68 may be different to create an accurate composite signal. Accordingly, the signal to noise ratio in the AC path is increased, and the switching noise is lowered in the DC path, to create a more precise converter.

Figure 7:
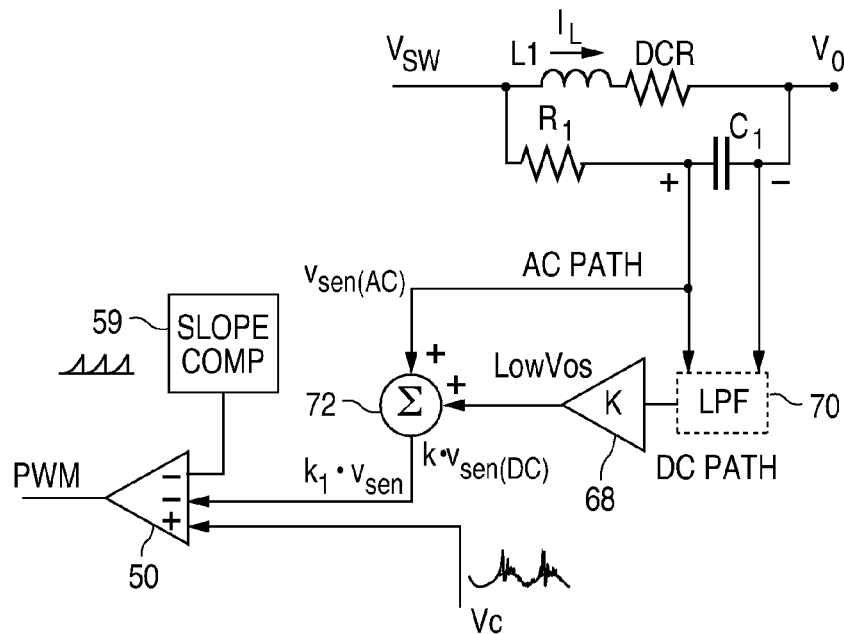
FIG. 7 illustrates a fourth embodiment of the invention where the AC and DC paths use the same RC circuit, and the DC sense signal is filtered by a low pass filter to filter out the switching noise and the overly amplified AC signal.

FIG. 7 illustrates a fourth embodiment of the invention where the AC and DC paths use the same R1C1 circuit, and the DC sense signal is filtered by a low pass filter 70 to filter out the switching noise and AC ripple. The R1C1 circuit is similar to that of FIG. 4, where the time constant is less than that of L1/DCR to obtain a higher signal to noise ratio. The AC sense signal is taken across the capacitor C1 as in FIG. 4. The DC sense signal is obtained by detecting the voltage across the capacitor C1, then filtering the signal by the low pass filter 70 to remove switching noise and AC ripple, then amplifying the signal by the amplifier 68 to cause the DC sense signal to have the proper proportion to the AC sense signal for no distortion. As previously mentioned, the amplifier 68 may also perform the filtering function. An advantage of the circuit of FIG. 7 is that an IC package that houses the control circuit uses only two pins to access the external C1 terminals for current sensing, just like the two terminals needed in the prior art controllers of FIGS. 1 and 2. Accordingly, the same packages can be used. Further, only one RC network is needed externally for current sensing.

Figure 8:
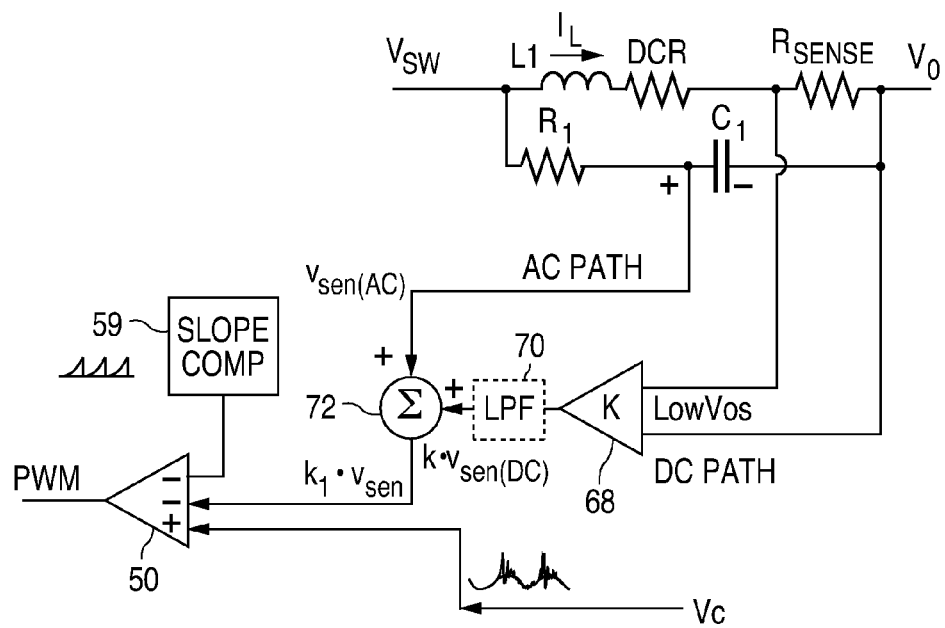
FIG. 8 illustrates a fifth embodiment of the invention where the DC current is sensed across a sense resistor.

FIG. 8 illustrates a fifth embodiment of the invention where the DC current is sensed across a low value sense resistor Rsense, which is typically formed to a tighter tolerance than the inductor DCR. The AC sense path is the same as in FIG. 4 except R1C1 is connected across the inductor L1 and Rsense. The voltage detected across Rsense is applied to the amplifier 68 and then filtered to remove the switch noise and ripple. As in previous embodiments, the gain K of the amplifier 68 is set to cause the DC sense signal to have the correct proportion to the AC sense signal to obtain an accurate composite current sense signal.

Figure 9:
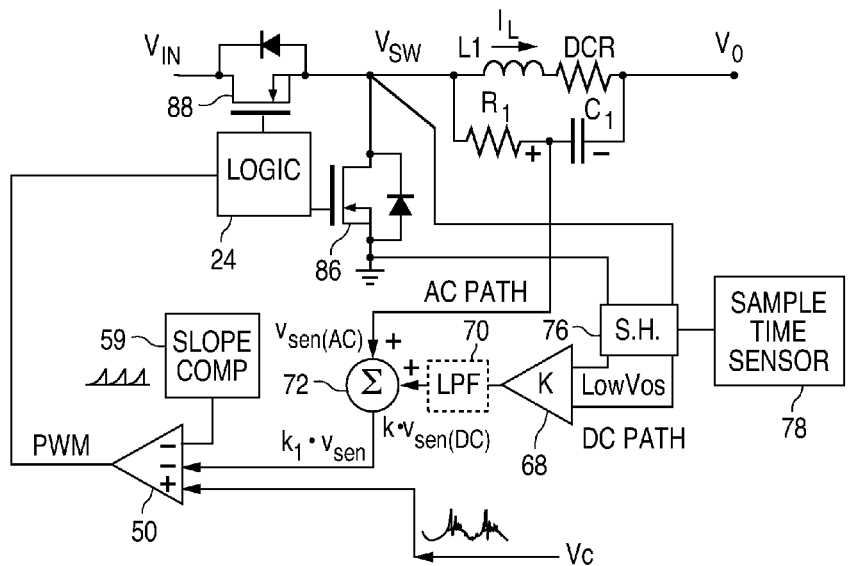
FIG. 9 illustrates a sixth embodiment of the invention where the DC current is sensed across a synchronous rectifier and held during the power switch on-time using a sample and hold circuit.

FIG. 9 illustrates a sixth embodiment of the invention where the DC current is sensed across a switch. FIG. 9 is similar to FIG. 8 in that the DC current is sensed across a resistance in series with the inductor L1. In this case, it is the on-resistance of the synchronous rectifier MOSFET 86. A midpoint of the downward sloping current ramp, when the synchronous rectifier MOSFET 86 is on, will be the same as the midpoint of the upward sloping current ramp when the power MOSFET 88 is on. Therefore, a sample and hold circuit 76 is controlled by the sample sensor 78 to sample the voltage across the MOSFET 86 at the midway point and hold the voltage during the time the power MOSFET 88 is on. The sampled voltage, after being amplified and filtered, is then summed with the AC sense signal during the time the power MOSFET 88 is on to create the composite current sense signal. The switching noise and ripple are effectively removed by the sample and hold circuit 76. In the embodiment, using a sample and hold circuit, the low pass filter 70 is optional. Similarly, the DC current signal can also be sensed across the top side power switch 88, with a sample and hold circuit sensing the current at midpoint of the upward sloping inductor current ramp.

Figure 10:
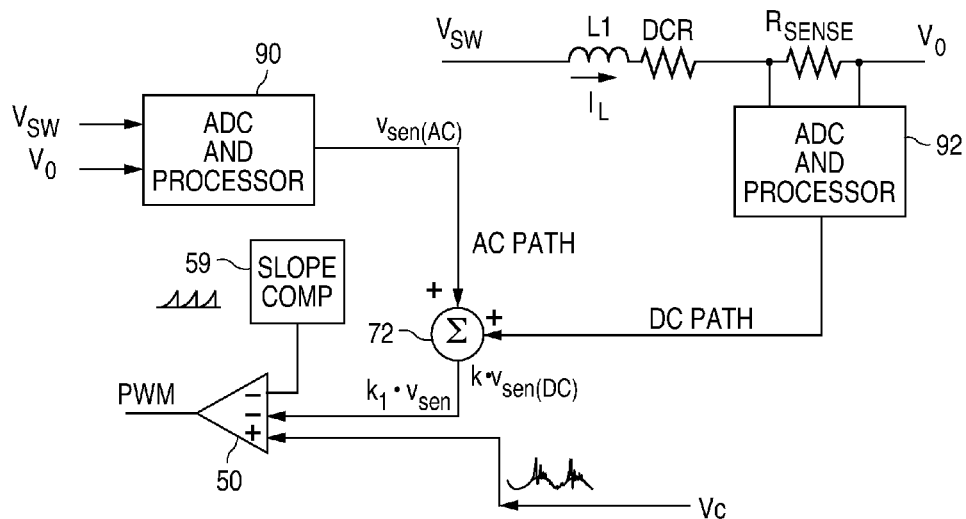
FIG. 10 illustrates a seventh embodiment of the invention where the AC and DC path signal processing is performed digitally.

FIG. 10 illustrates a seventh embodiment of the invention where the AC and DC path signal processing is performed digitally. Instead of pure analog sensing, amplifying, and summing in all the embodiments, the voltages detected are converted to digital signals by analog-to-digital converters (ADCs) 90 and 92 and then processed digitally. In one embodiment, the summing is performed digitally, and the comparison with the control voltage Vc (converted to a digital signal) is performed digitally. In such a case, the PWM comparator 50 is implemented as a digital comparator. The particular implementation of FIG. 10 is just an example of how any of the embodiments can be converted to perform various processes in the digital domain.

The various embodiments described herein may be combined in any way such that there are separate AC and DC sense paths, where the DC path has switching noise and ripple removed and/or the AC path has an increased signal to noise ratio. Additionally, although an amplifier with a gain greater than 1 has been shown in the DC path to adjust the magnitude of the DC sense signal to have the proper proportion to the AC sense signal, the amplifier may instead be inserted into the AC path, with a gain less than one.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A switching power supply comprising:
a switch switching at a switching frequency, the switch having an input terminal for coupling to an input voltage;
an inductor having a first terminal coupled to an output terminal of the switch so as to conduct current to a second terminal of the inductor during an on-time of the switch, current through the inductor ramping up during the on-time of the switch, current through the inductor having a low frequency DC component and a higher frequency AC component;
a current detection circuit for detecting the current through the inductor comprising:
a first detection circuit generating a first voltage signal corresponding to the AC component of current through the inductor, the first detection circuit configured to process the AC component to increase a signal-to-noise ratio in the AC component;
a second detection circuit generating a second voltage signal corresponding to the DC component of current through the inductor, the second detection circuit configured to filter switching noise from the DC component to reduce the switching noise in the DC component; and
a summing circuit summing the first voltage signal and the second voltage signal to generate a third voltage signal corresponding to the instantaneous current through the inductor;
a pulse width modulation (PWM) comparator comparing the third voltage signal to a control voltage, corresponding to an output voltage of the power supply, to control a peak current through the inductor, an output of the PWM comparator triggering when the third voltage signal approximately equals the control voltage for controlling a duty-cycle of the switch to generate a regulated output voltage of the power supply.

2. The power supply of claim 1 wherein first voltage signal and second voltage signal are analog signals.

3. The power supply of claim 1 wherein at least one of the first voltage signal and the second voltage signal is a digital signal.

4. The power supply of claim 1 wherein the third voltage signal and control voltage are analog signals.

5. The power supply of claim 1 wherein the inductor has a winding having a DC resistance (DCR) and an inductance of L, wherein L/DCR is a first time constant,
wherein the first detection circuit comprises:
a first resistor, having a resistance of R1, in series with a first capacitor, having a capacitance of C1, connected at least across the inductor, wherein R1*C1 is a second time constant less than the first time constant.

6. The power supply of claim 1 wherein the second detection circuit comprises:
a second resistor, having a resistance of R2, in series with a second capacitor, having a capacitance of C2, connected across the inductor, wherein R2*C2 is a second time constant equal to or greater than the first time constant; and
a low pass filter coupled between the summing circuit and the second capacitor.

7. The power supply of claim 6 wherein the second detection circuit further comprises an amplifier connected between the second capacitor and the summing circuit.

8. The power supply of claim 6 wherein the second detection circuit further comprises a sample and hold circuit controlled to sample an average inductor current.

9. The power supply of claim 5 wherein the second detection circuit comprises a low pass filter and an amplifier coupled between the first capacitor and the summing circuit.

10. The power supply of claim 5 wherein the second detection circuit comprises:
a differential amplifier coupled across the first capacitor; and
a low pass filter coupled between the first capacitor and the summing circuit.

11. The power supply of claim 5 further comprising a sense resistor connected in series with the inductor, wherein the second detection circuit comprises:
a differential amplifier coupled across the sense resistor; and
a low pass filter coupled between the sense resistor and the summing circuit.

12. The power supply of claim 5 wherein the switch comprises a first switch, the power supply further comprising a second switch connected as a synchronous rectifier, the second switch having a first terminal coupled to the inductor and a second terminal coupled to a reference voltage, wherein the second detection circuit detects a voltage across the second switch.

13. The power supply of claim 12 wherein the second detection circuit comprises a sample and hold circuit connected across the second switch, wherein an output of the sample and hold circuit is filtered by a low pass filter.

14. The power supply of claim 13 further comprising an amplifier coupled between the sample and hold circuit and the summing circuit.

15. The power supply of claim 1 wherein the first detection circuit comprises a differential amplifier having inputs coupled to the output terminal of the switch and the output voltage of the power supply, the amplifier having an output coupled to the summing circuit.

16. The power supply of claim 15 wherein the amplifier is a transconductance amplifier.

17. A method of operating a switching power supply comprising:
   switching a switch at a switching frequency, the switch having an input terminal for coupling to an input voltage;
   conducting a current through an inductor having a first terminal coupled to an output terminal of the switch so as to conduct the current to a second terminal of the inductor during an on-time of the switch, current through the inductor ramping up during the on-time of the switch, current through the inductor having a low frequency DC component and a higher frequency AC component;
   detecting the current through the inductor comprising the steps of:
      generating a first voltage signal, by a first detection circuit, corresponding to the AC component of current through the inductor wherein generating the first voltage signal comprises processing the AC component to increase a signal-to-noise ratio in the AC component;
      generating a second voltage signal, by a second detection circuit, corresponding to the DC component of current through the inductor, wherein generating the second voltage signal comprises filtering switching noise from the DC component to reduce the switching noise in the DC component; and
      summing the first voltage signal and the second voltage signal, by a summing circuit, to generate a third voltage signal corresponding to the instantaneous current through the inductor;
   comparing the third voltage signal to a control voltage corresponding to an output voltage of the power supply, by a pulse width modulation (PWM) comparator, to control a peak current through the inductor, an output of the PWM comparator triggering when the third voltage signal approximately equals the control voltage for controlling the on-time of the switch to generate a regulated output voltage of the power supply.

18. The method of claim 17 wherein the inductor has a winding having a DC resistance (DCR) and an inductance of L, wherein L/DCR is a first time constant,
   wherein the first detection circuit comprises:
      a first resistor, having a resistance of R1, in series with a first capacitor, having a capacitance of C1, connected across the inductor, wherein R1*C1 is a second time constant less than the first time constant.

19. The method of claim 17 wherein the second detection circuit comprises:
   a second resistor, having a resistance of R2, in series with a second capacitor, having a capacitance of C2, connected across the inductor, wherein R2*C2 is a second time constant equal to or greater than the first time constant; and
   a low pass filter connected between the second capacitor and the summing circuit.

20. The method of claim 19 wherein the second detection circuit further comprises an amplifier connected between the second capacitor and the summing circuit.

* * * * *